(12) United States Patent
Wraith et al.

(10) Patent No.: US 6,676,166 B1
(45) Date of Patent: Jan. 13, 2004

(54) PLASTIC PIPE COUPLING SYSTEM

(76) Inventors: Matthew William Wraith, 321 Ginger Ct., San Ramon, CA (US) 94583; Michael Alan Costa, 1659 Livermore Way, Livermore, CA (US) 94550; Ronald Louis Pastrone, 430 Asbury Ct., Livermore, CA (US) 94550

( * ) Notice: Subject to any disclaimer, the term of this patent is extended or adjusted under 35 U.S.C. 154(b) by 0 days.

(21) Appl. No.: 10/082,559

(22) Filed: Feb. 25, 2002

(51) Int. Cl.$^7$ .................... F16J 15/00; F16L 55/00
(52) U.S. Cl. .................. 285/86; 285/255; 285/382
(58) Field of Search .................. 285/382, 86, 255; 29/505, 508, 520

(56) References Cited

U.S. PATENT DOCUMENTS

| | | | |
|---|---|---|---|
| 3,217,400 A | 11/1965 | Illesy | |
| 3,784,235 A | 1/1974 | Kessler | |
| 3,960,429 A | * 6/1976 | Moulin | 339/91 |
| 4,392,294 A | 7/1983 | Campbell | |
| 4,451,069 A | * 5/1984 | Melone | 285/86 |
| 4,779,902 A | 10/1988 | Lee | |
| 4,875,714 A | 10/1989 | Lee | |
| 5,078,430 A | 1/1992 | St. Onge | |
| 5,180,197 A | 1/1993 | Thompson | |
| 5,470,113 A | * 11/1995 | Schwalm et al. | 285/255 |
| 5,662,360 A | 9/1997 | Guzowski | |
| 5,918,914 A | 7/1999 | Morris | |
| 6,108,895 A | * 8/2000 | Helsley, Jr. | 29/516 |
| 6,367,850 B1 | * 4/2002 | Thrift et al. | 285/382 |

* cited by examiner

Primary Examiner—David Bagnell
Assistant Examiner—Giovanna M Collins

(57) ABSTRACT

A plastic pipe coupling system including a female coupling and a support ring. A circumferential groove is molded or cut into the outer diameter of a plastic pipe. The female coupling includes a reduced diameter portion with a coupling rib at the free end. The ends of the pipe, coupling, and support ring are beveled in order that the ends pressed together engage and by the slight resiliency of the plastic construction permit the slight expansion and contraction of the ends to provide a locking interfit of the respective groove and rib at the two ends. There is an interference fit between the support ring and the coupling so that a radial preload is induced when the support ring is assembled onto the coupling. The inner surface of the sleeve or the outer surface of the coupling is tapered for ease of installation of the support ring over the coupling and to provide radial support to keep the coupling in the groove. Installation of the support ring over the female coupling results in a mechanically strong joint under axial and bending loads. Additionally, the joint is water tight under pressure without the use of a rubber gasket or solvent.

11 Claims, 3 Drawing Sheets

PLASTIC PIPE COUPLING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates generally to plastic pipe systems or tubes of the type used particularly but not exclusively for irrigation systems, potable water, sewage, electrical power lines, and for any structures made from pipe or tube components which are assembled together.

Plastic pipe systems formed from polyvinyl chloride, chlorinated polyvinyl chloride, polyethylene and other plastic materials are widely used for a variety of applications at the present time. With the advent of plastic pipe materials a need has existed for connecting lengths of pipe together to form a string of pipes or a structure.

Currently there are several methods employed for joining plastic pipe or tubing strings. The most commonly used methods feature use of solvents and couplings, or specialized couplings, which include gaskets when a fluid seal is desired, or pipes with integral end connections.

In the first case, a solvent is applied to the free ends of two or more pipes and a coupling piece. The coupling piece can be integral to the pipe in the form of a bell end or can be a separate piece such as an elbow, a "T", a "Y", a cross or similar coupling. The solvent is used to join the pipe and coupling pieces together. In the case of fluid transport or electrical power lines, the solvent also provides a liquid seal.

There are numerous inherent liabilities when utilizing solvents to join pipe components:

(a) The solvents typically have a short working time typically about ten seconds. Once the solvent has set, relative motion of the parts is not possible.

(b) A solvent bond does not allow for any rotational or axial misalignment of the pipe joints. Misalignment can occur when assembling a pipe string that has an elbow, "T", "Y" or other geometry which requires specific rotational alignment.

(c) Disassembly of the parts after the solvent has set requires destructive techniques. The fittings must be cut off and a new fitting added.

(d) The mating surfaces which are to be solvent welded need to be clean and dry before application of the solvent.

(e) Before testing the system for integrity of a sealed connection the solvent must be completely cured.

(f) The unused solvent hardens over time until it is no longer usable.

(g) Frequently, use of a primer is recommended further complicating the task.

(h) The solvent is difficult to use. The solvent and primer tend to get on surfaces beyond the desired surfaces such as clothing, hands, and other pipe components. The threaded caps on the solvent cans can be difficult to open particularly if any solvent has dripped onto the threaded surfaces. It is not unusual to spill the solvent can.

(i) Use of solvents for joining pipe components is unpleasant, and potentially hazardous. The fumes represent a health hazard and are unpleasant. The solvents can be extremely flammable and can cause damage to the environment.

Alternatively, as mentioned previously, lengths of pipe can be joined using couplings and gaskets. Listed below are two critical disadvantages in using couplings with gaskets to join pipes:

(a) Couplings that require a gasket for sealing are very expensive and hence are rarely used for residential irrigation.

(b) These couplings are dimensionally large making them difficult to incorporate in pipe or tube strings. The increase in diameter can make it difficult to put many pipe strings in an irrigation trench such as those for residential sprinkler systems that are typically limited in size.

Various types of connections have been devised which do not have coupling parts but instead have integral end connections. Several types of plastic pipe joining systems have been proposed—for example in the U.S. Pat. No. 5,918,914 to Morris (1999), U.S. Pat. No. 5,662,360 to Guzowski (1997), U.S. Pat. No. 5,078,430 to St. Onge (1992), U.S. Pat. No. 4,875,714 to Lee (1989), U.S. Pat. No. 4,779,902 to Lee (1988), U.S. Pat. No. 3,784,235 to Kessler (1974), and U.S. Pat. No. 3,217,400 to Illesy (1965). For all of these patents, repairs are very difficult, that is, in order to repair a broken section without the use of a coupling, the entire pipe must be replaced. Additionally these patents suffer from a combination of the following problems: requires a complex, integral end connection that can not accommodate custom lengths, requires a gasket or solvent for sealing, does not include a press fit outer ring for support of the coupling under bending loads, requires tight tolerancing. U.S. Pat. No. 5,918,914 and U.S. Pat. No. 5,662,360 have complex, integral end connections, require gaskets for sealing, and lack support for bending loads. U.S. Pat. No. 5,078,430 has a complex, preformed, integral end connection, can not accommodate custom lengths, and requires a gasket for sealing. U.S. Pat. No. 4,875,714 has a complex, preformed, integral end connection, requires tight tolerancing, can not be easily disassembled, and can not accommodate custom lengths. U.S. Pat. No. 4,779,902 and U.S. Pat. No. 3,784,235 require a gasket or adhesive for sealing, can not accommodate custom lengths, and can not be easily repaired without the use of a coupling. U.S. Pat. No. 3,217,400 can not be easily repaired or disassembled, and does not have an outer ring to support against bending loads. These devices and others which feature integral end connections without separate coupling parts have several disadvantages:

(a) Fabrication of the pipe or tubing is complicated. The pipe can not be simply extruded but requires additional machining or other laborious fabrication process.

(b) Key components can not be easily fabricated in the field so they are impractical for applications which require customized pipe lengths.

(c) The joint is mechanically weak in bending.

(d) Relatively tight tolerancing is required between the mating surfaces.

(e) The parts generally can not be easily disassembled.

(f) Repair of a broken section requires the replacement of the entire pipe.

Patents that feature couplings can be complex. U.S. Pat. No. 5,180,197 to Thompson Jr. (1993) features a coupling made from two different materials; a hard outer plastic shell encasing a gasket-like, soft, elastomeric material for sealing. U.S. Pat. No. 4,392,294 to Campbell (1983) requires an outer metallic support ring which is bolted together and requires that the pipe ends be butted together.

Many pipe string applications require that the pipes provide an effective, fluid-tight barrier between the contents of the pipe and the environment surrounding the pipe. For example, the piping may need to provide a shield for protecting electrical conductors or the pipes may contain sewage or caustic chemicals. What is needed is a simple, inexpensive pipe coupling system which can be easily used in the field for custom applications, allows for easy assembly and alignment of components, and maintains a fluid seal without the use of cements or solvents.

BRIEF SUMMARY OF THE INVENTION

The present invention provides a system for joining lengths of plastic pipe using a coupling and an outer ring. A shallow groove is cut into the end of a pipe, a specialized coupling is snapped into the groove and an outer ring is added to provide additional mechanical strength. It is an object of the present invention to provide an interlocked restraint for a plastic pipe coupling system. This is accomplished by cutting a shallow groove into the end of a pipe using a basic cutting tool. Next a ring with an internal taper is slid over the free end of the pipe. The ring is designed such that the inside diameter of this ring is larger than the outside diameter of the pipe so the ring is free to slide over the pipe. A female coupling is slipped onto the pipe and snaps in place in the cut groove in the pipe. The ring is then manually installed over the coupling. The inside diameter of the tapered ring is smaller than the outside diameter of the coupling so that it provides additional mechanical support to the female coupling.

The snap joints of the invention are a very simple, economical and rapid way of joining two different components. It is only necessary that a protruding part of one component be deflected briefly during the joining operation in order to catch in a depression in the mating component.

Another object of the invention is to provide couplings which are much smaller in size than existing couplings which do not require solvents.

Another object of the invention is to provide couplings which are of a simpler design and are considerably less expensive than existing couplings which do not require solvents.

Another object of the invention is to provide a joint which can be easily rotated to achieve proper alignment during the assembly process—this feature is useful if the pipe ends are not collinear such as is the case when one uses an elbow or "T".

Another object of the invention is to provide a pipe joint which can be easily disassembled and without the use of special tools.

Another object of the invention is to allow some translation of the coupling relative to the pipe ends to facilitate the installation process.

Another object of the invention is that the joint will provide a fluid seal without use of primers or solvents.

Another object of the invention is to provide a pipe coupling system which can be assembled at any speed the user chooses without concern over solvents curing.

Another object of the invention is to provide such a secure interlocked end connection for a joint of plastic pipe which does not rely upon the use of threaded connections.

Another object of the invention is to provide a fluid seal without a gasket.

Another object of the invention is to provide a joint which maintains a seal even under substantial bending loads.

Another object of the invention is to provide a joint which can be assembled even if it is wet and can be immediately checked for integrity of the fluid seal.

Another object of the invention is to provide such a secure end connection for a plastic pipe system which securely prevents the connected ends from pulling apart in service to thereby prevent damage to the pipeline and environment.

Further objects and advantages of my invention will become apparent from a consideration of the drawings and ensuing description.

Thus the reader will see that the pipe coupling system of the invention is simple, economical, user friendly, environmentally friendly, highly reliable and robust, yet easily adaptable to different field conditions.

Figure 1:
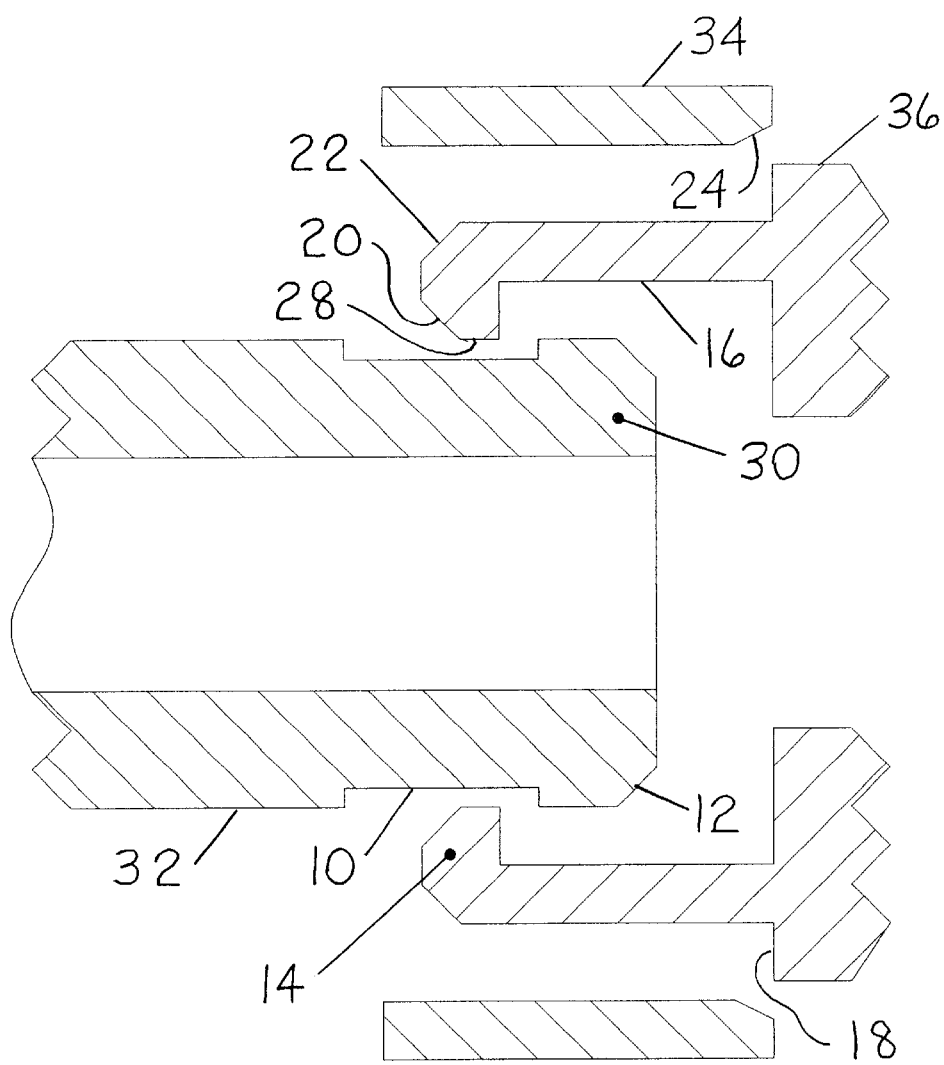
FIG. 1 shows an exploded view of the invention.

a "T", a straight union, and an elbow respectively.

REFERENCE NUMERALS IN DRAWINGS 10 groove
12 pipe chamfer
14 coupling rib
16 coupling recess
18 positioning shoulder
20 coupling inner chamfer
22 coupling outer chamfer
24 support ring lead-in chamfer
26 support ring load chamfer
28 sealing surface
30 pipe rib
32 pipe
34 support ring
36 coupling
38 coupling load chamfer

DESCRIPTION OF THE INVENTION

Figure 2B:
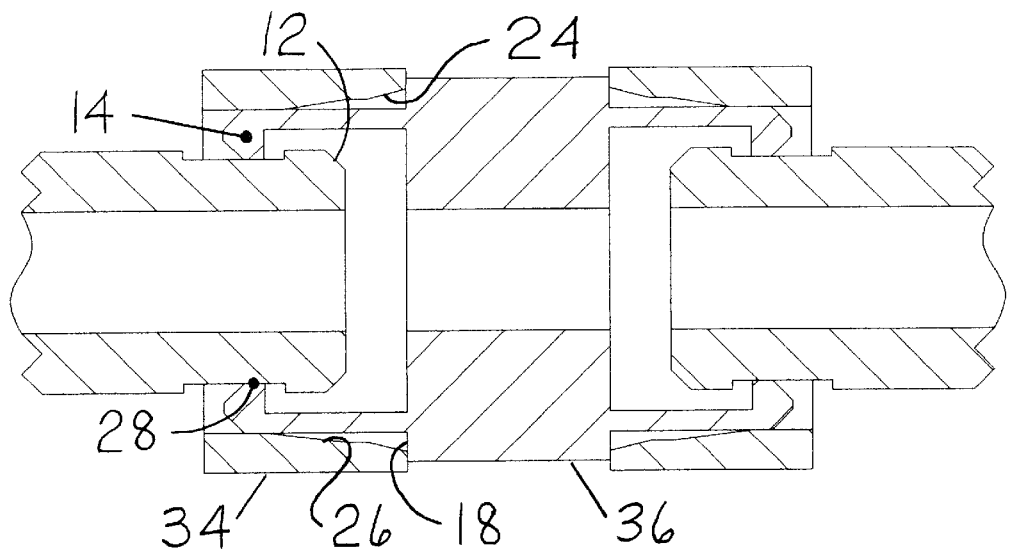
FIGS. 2A and 2B are assembly views of different embodiments of the invention.
Figure 2A:
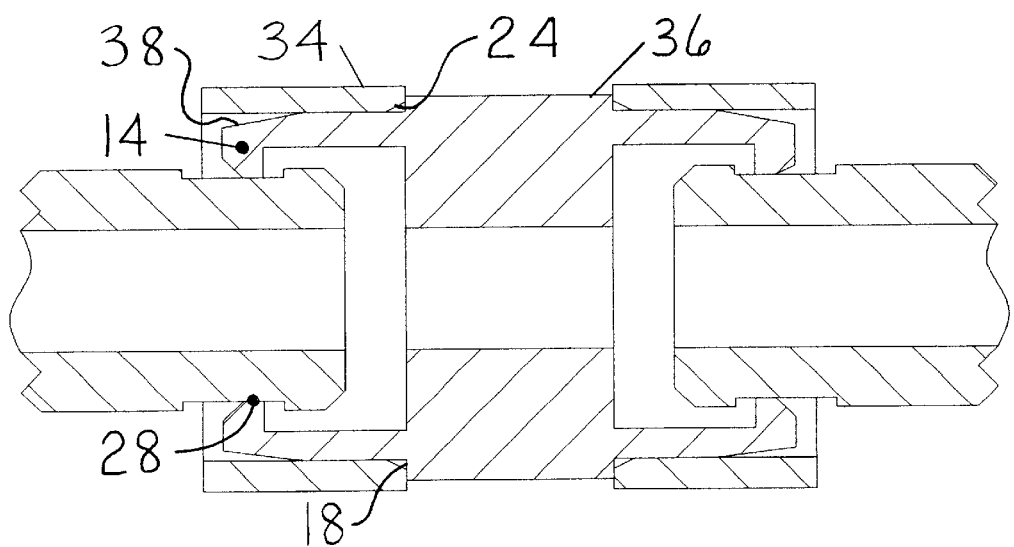
Figure 3C:
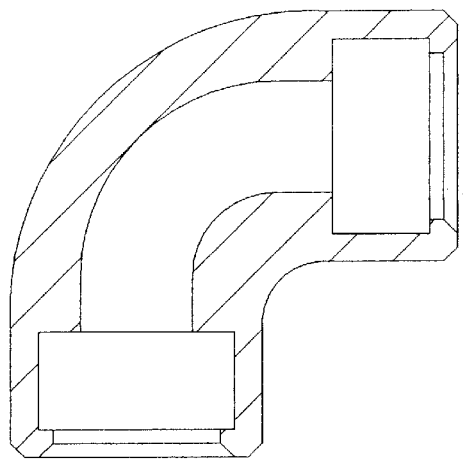
FIGS. 3A, 3B, and 3C show a few of the many ways the coupling may be configured.
Figure 3B:
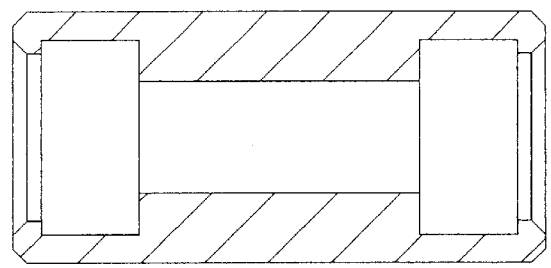
Figure 3A:
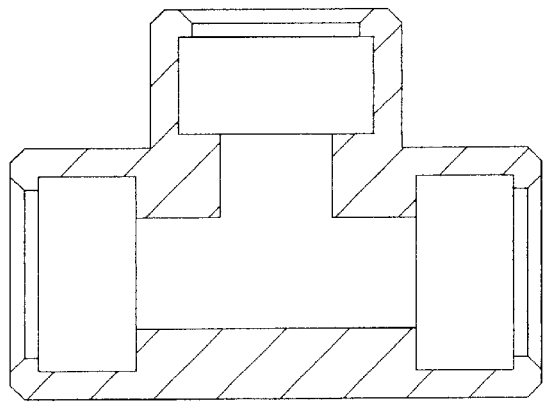

A typical embodiment of the pipe coupling system of the present invention is illustrated in FIG. 1 (exploded view). The invention comprises a pipe or tube 32, a support ring 34, and a joint or coupling 36. FIGS. 2A and 2B show the final assembly for two different configurations of the present invention. FIGS. 3A, 3B, 3C illustrate some of the many configurations in which the coupling of the present invention can be employed.

Pipe 32 is typically made from schedule 40 polyvinyl chloride pipe of the type commonly used for irrigation. Other options exist including but not limited to fabricating the pipe from polyvinyl chloride conduit or thicker walled schedule 80 polyvinyl chloride pipe. The pipe is preferably made from polyvinyl chloride but other plastic materials having similar characteristics of strength and flexibility may be employed. The pipe may range in diameter from about one half inch to over three inches and have a substantial wall thickness to withstand internal pressure or provide strength as required for the specific application. The pipe will not be limited to any specific length but instead be of whatever length is required for its particular application.

Each end of pipe will have a groove 10 as illustrated in FIG. 1. Additional grooves may be added if greater load carrying capability is required. In order to facilitate the joining of pipe and coupling, the pipe may also feature a bevel or a pipe chamfer 12 located at the ends of the pipe as illustrated in FIG. 1. The groove 10 and chamfer 12 are formed on the exterior surface of the pipe using a simple hand held cutting tool or can be incorporated during the fabrication of the pipe itself as in the molding or machining process.

Support ring 34 can be made from polyvinyl chloride but other plastic materials having similar characteristics of strength and rigidity may be employed. Alternatively, the support ring can be made of a metal such as aluminum, brass, copper or steel. The leading edge of the support ring shall have an inner diameter larger than the outer diameter of coupling 36 as best illustrated in FIG. 1. The leading edge may feature a bevel or lead-in chamfer to facilitate assembly over coupling 36. As an assembly aid, the support ring can have a bevel, conical section or load chamfer 26 on the inner diameter, which will provide a gradual transition to a reduced inner diameter as, shown in FIG. 2B.

The reduced inner diameter of the support ring will be larger than pipe 32 so that it will be possible to freely slide the support ring over the pipe as required during the assembly process.

The reduced inner diameter of the support ring will be equal to or smaller than the outer diameter of the coupling so that when the support ring is slid over the coupling it will trap and restrain the coupling. The support ring will have a thickness sufficient to provide the desired radial support to the coupling, typically, approximately the same thickness as the pipe. While the above description features the load chamfer and lead-in chamfer on one end of the support ring, it does not preclude placing these features on both ends of the support ring so that the part is symmetric and can be assembled in either direction.

Coupling 36 as shown in FIG. 1 is preferably made from polyvinyl chloride but other plastic materials having similar characteristics of strength and flexibility may be employed. The coupling can take any of the various forms typically encountered in irrigation connections. Specifically, the coupling can be shaped as a straight union, an elbow, a "T", a "Y", a cross or any other desired geometry, some of which are illustrated in FIGS. 3A, 3B, and 3C. The current invention relates to the joining method. The coupling preferably is a molded part but can be machined. The coupling has an inner protrusion or rib 14 as shown in FIGS. 1, 2A and 2B. Additional ribs may be added if greater load carrying capability is required. The inner diameter of rib 14 will be less than the outer diameter of the pipe as shown in FIG. 1. The inner leading edge of the rib may feature a bevel or inner chamfer 20 to facilitate assembly over the pipe as illustrated in FIG. 1. Similarly, the outer leading edge of coupling rib 14 may feature a bevel or outer chamfer 22 to facilitate sliding the ring over the coupling as illustrated in FIG. 1. The rib is shorter than groove 10 such that upon assembly, the rib fits easily within the length of the groove as illustrated in FIG. 1. The coupling has a thin walled annular section or recess 16 which is of sufficient length to freely accommodate the pipe rib 30 as shown in FIG. 1. The wall of the coupling in the area of recess 16 is a predetermined thickness which provides a sturdy structure, while still maintaining enough flexibility that the coupling can be easily manually snapped in place over the pipe. Similarly, the length of the recess should be sized to allow sufficient flexibility that the coupling can be easily snapped in place over the pipe. The coupling may optionally have a stop or positioning shoulder 18 as illustrated in FIG. 1. The positioning shoulder is to aid proper placement of support ring 34 onto coupling 36 as shown in FIGS. 2A and 2B. Positioning shoulder 18 is dimensioned such that it can provide a positive stop while assembling the support ring onto the coupling.

An additional embodiment of the current design is shown in FIG. 2A. In this embodiment, a bevel, conical section, or coupling load chamfer 38 is located on the outer diameter of coupling rib 14. The coupling load chamfer serves the same function as the previously described support ring load chamfer. The support ring has a close or interference fit with the coupling thereby trapping and restraining the coupling to the pipe. The coupling is an assembly aid by providing a gradual transition when assembling the support ring over the coupling. In this embodiment, the support ring is a basic cylinder, that is, it has a constant inner diameter. An optional support ring lead-in chamfer 24 may be added to the support ring to facilitate assembly of the support ring over the coupling as shown in FIG. 1.

Although the description above contains many specifications, these should not be construed as limiting the scope of the invention but as merely providing illustrations of some of the presently preferred embodiments of this invention. Accordingly, the scope of the invention should be determined not by the embodiments illustrated, but by the appended claims and their legal equivalents.

OPERATION OF INVENTION

The pipe and coupling system of this invention is simply and easily assembled together to provide a stable and reliable locking engagement.

Pipe 32 features groove 10 formed during initial fabrication or added later by using a simple hand held cutting tool. Support ring 34 has an inner diameter larger than the outer diameter of pipe 32. The support ring is preassembled by sliding over the free end of the pipe. The support ring is positioned such that groove 10 is not obstructed. The support ring is oriented such that the support ring lead-in chamfer 24 is toward groove 10 or the free end of pipe 32. Next, coupling 36 and pipe 32 are manually press fitted together. This is accomplished by manually applying a small axial load to the pipe and coupling. Coupling rib 14 distends as the coupling is slid over the end of the pipe and then snaps in place into the groove. The coupling rib, under a small applied load, can slide or translate within the confines of groove 10. Coupling 36 is manually rotated to the preferred orientation per the design of the pipe string. The assembly is completed by sliding support ring 34 over the coupling, trapping coupling rib 14 against groove 10 of the pipe. The coupling forms a fluid seal with the pipe at sealing surface 28 as shown in FIGS. 2A and 2B. If the coupling includes the optional positioning shoulder 18, the support ring is butted against the positioning shoulder. The steps described above are repeated when connecting the other free end or ends of the same coupling to other pipe or pipes as dictated by the configuration. The completed assembly, for which the coupling is a simple union as shown in FIG. 3B, is illustrated for two different embodiments of the invention in FIGS. 2A and 2B.

An important aspect of the present invention is that disassembly is simple. Partial disassembly of the coupling joint in order to adjust the rotational or axial alignment of the coupling with mating elements in the pipe string or replacement of components is easily accomplished. Slide the support ring over the pipe away from the coupling. Rotate or translate the coupling to the desired location. Slide the support ring back over the coupling. Total disassembly of the current invention can be easily manually accomplished by following the reverse order of the assembly. Slide the support ring off the coupling. Pull the coupling free of the pipe. Remove the support ring.

What we claim as our invention is:

1. A plastic pipe coupling system comprising a plastic pipe having at least one annular groove, a coupling having a thin walled section or recess with at least one corresponding rib, and a support ring, said coupling and pipe being adapted to be axially press-fitted together to distend said coupling and compress said pipe until a sealing surface of the at least one rib rests within the at least one annular groove on said pipe, said support ring being forcibly slid over said coupling, trapping said coupling in said groove, to form a locked end connection with said pipe and said coupling, and said groove of said pipe having a predetermined diameter, said rib of said coupling having a predetermined cross sectional shape and said support ring having a predetermined thickness and diameter whereby a sufficient compressive load exists between said rib, said groove and said support ring as to provide a fluid seal without the use of solvents, glues or gaskets, wherein an axial length of said groove is longer than a length of said sealing surface of said rib such that said rib can move axially in the groove before said support ring is installed.

2. The plastic pipe coupling system of claim 1 wherein said support ring is internally tapered to facilitate assembly and trapping of said coupling in said groove.

3. The plastic pipe coupling system of claim 1 wherein said coupling is tapered on the external surface to facilitate assembly and trapping of said coupling in said groove.

4. The plastic pipe coupling system of claim 1 wherein the plastic material for said pipe and said coupling is a material selected from the group consisting of polyethylene, polypropylene, polyvinyl chloride, polybutylene, and chlorinated polyvinyl chloride.

5. The plastic pipe coupling system of claim 1 wherein the material for said support ring is a material selected from the group consisting of polyethylene, polypropylene, polyvinyl chloride, polybutylene, chlorinated polyvinyl chloride, steel, brass, aluminum, and copper.

6. The plastic pipe coupling system of claim 1 wherein the leading edge of said pipe having a beveled surface whereby generating a wedging action to distend said coupling and compress said pipe during assembly.

7. The plastic pipe coupling system of claim 1 wherein the interior leading edge of said coupling having a beveled surface whereby generating a wedging action to distend said coupling and compress said pipe during assembly.

8. The plastic pipe coupling system of claim 1 wherein the exterior leading edge of said coupling having a beveled surface whereby facilitating assembly of said support ring over said coupling.

9. The plastic pipe coupling system of claim 1 wherein said coupling has a raised feature on the exterior which acts as an axial locating feature for positioning of said support ring over said coupling during assembly.

10. The plastic pipe coupling system of claim 1 wherein the interior leading edge of said support ring having a beveled surface whereby facilitating assembly of said support ring over said coupling.

11. The plastic pipe coupling system of claim 1 wherein said coupling and said support ring having a predetermined wall thickness thereby having the ability to withstand an internal pressure approximately commensurate with said pipe.

* * * * *